United States Patent

Hrabak et al.

[11] 4,006,147
[45] Feb. 1, 1977

[54] TETRACHLOROETHOXYETHYL ESTERS AND METHOD FOR THEIR PREPARATION

[75] Inventors: Frantisek Hrabak; Karel Bochal, both of Prague, Czechoslovakia

[73] Assignee: Ceskoslovenska akademie ved, Prague, Czechoslovakia

[22] Filed: Dec. 21, 1973

[21] Appl. No.: 427,224

[30] Foreign Application Priority Data

Dec. 28, 1972 Czechoslovakia ............... 9028/72
Dec. 28, 1972 Czechoslovakia ............... 9029/72

[52] U.S. Cl. .................... 260/486 H; 526/292; 526/294; 526/320
[51] Int. Cl.² ................................ C07C 69/54
[58] Field of Search .................... 260/486 H

[56] References Cited
OTHER PUBLICATIONS

Roberts & Caserio, Basic Principles of Organic Chemistry, W. A. Benjamin, Inc., 1965, N.Y.
J. March, Advanced Organic Chemistry, Mechanism & Structure, McGraw-Hill, N.Y., pp. 268–269.

*Primary Examiner* — Paul J. Killos

[57] ABSTRACT

Tetrachloroethoxyethyl acrylate and tetrachloroethoxyethyl methacrylate of the general formula

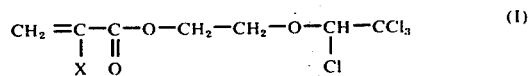

are provided, where X is a hydrogen atom or $CH_3$ radical. Also their homopolymers and mixed polymers are combined with vinyl and diene compounds. The aforesaid monomers are prepared by reacting the compound of the general formula

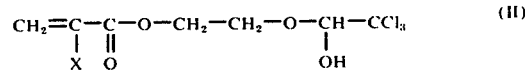

with thionyl chloride, preferably in presence of compounds able to bind released hydrogen chloride, such as organic or inorganic bases, for instance, pyridine, triethylamine and sodium carbonate.

1 Claim, No Drawings

TETRACHLOROETHOXYETHYL ESTERS AND METHOD FOR THEIR PREPARATION

DETAILED DESCRIPTION OF THE INVENTION

The invention relates to the formation of tetrachloroethoxyethyl esters and particularly to tetrachloroethoxyethyl acrylates and methacrylates of the general formula

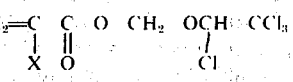

where X is a hydrogen atom or $CH_3$ radical, and their homopolymers and mixed polymers may be produced, especially with vinyl and diene compounds.

The esters and compounds of the present invention were not known in the prior art. It has been found however that these new esters and compounds can be used as monomers and comonomers in the formation of compatible polymers and may be used in a variety of forms to which other polymers have been used. The material is particularly resistant to combustion.

According to a further aspect of the present invention, the compounds of the general formula I are produced, by treating a compound of the general formula II

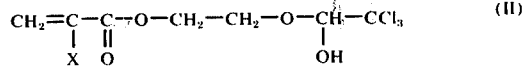

where X is a hydrogen atom or $CH_3$ radical with a thionyl chloride. The compound of formula II is an addition product of chloral and glycol monomethacrylate and glycol monoacrylate, respectively. Preferably, n moles of the compound II are reacted with $0.5n$ to $2n$ moles of thionyl chloride.

The yield of this reaction is substantially increased in the presence of compound able to bind the released hydrogen chloride, such as organic or inorganic bases, e.g. pyridine, triethylamine, and sodium carbonate.

To make the removal of the reaction heat easier, a solvent may be used which does not react with the starting components at all. Chloroform, ether, tetrachloromethane, are suitable. Also solvents which react only to a small extent with the starting components, e.g. benzene or toluene may be used.

Thionyl chloride and the compound of the general formula II may be used in an equimolar ratio, however an excess of 5-40% of thionyl chloride, related to the stoichiometric amount, is used as a rule to achieve a total substitution of hydroxy groups by chlorine in the compound of the general formula II.

The starting components are preferably mixed at a temperature within the range $-10$ to $+20°$ C. stirring and cooling is maintained during mixing. The reaction is completed by heating the reaction mixture to a higher temperature or to the boiling temperature.

The starting unsaturated compound of the general formula II may be stabilized, in the course of the reaction, by the addition into the mixture of a radical polymerization inhibitor, for instance benzoquinone. The resulting product of the general formula I can be stabilized in the same way even afterwards.

Broadly, another object of this invention is the production of homopolymers as well as mixed polymers of tetrachloroethoxyethyl acrylates and methacrylates having the general formula I, where the ester of the general formula I or its mixture with other vinyl compounds or dienes may be polymerized by addition of a radical polymerization initiator and heated to the temperature, at which this initiator decays into free radicals. Solutions, aqueous emulsions or suspensions of the novel monomers can also be used in the polymerization, instead of pure monomers.

To start the polymerization of the above described esters, all conventional initiators or initiation systems used in radical polymerization of known monomers with unsaturated bonds may be used, as e.g. dibenzoyl peroxide and azobisisobutyronitrile.

The polymerization temperature is chosen according to the character of initiator or initiation system used, to attain sufficiently rapid decomposition of the initiator into free radicals. Thus, for example, when the initiation redox system commonly used for emulsion polymerization is employed, the rate of the initiator decay becomes sufficiently high even in the temperature region from $0°$ to $30°$ C, while in the polymerization of unsaturated compounds in bulk, initiated by hydroperoxides, the polymerization mixture must be heated to $100°-120°$ C before substantially decay occurs.

All vinyl and diene compounds can be used as comonomers of the esters having the general formula I, which proved their ability to homopolymerize or copolymerize with another unsaturated compound, namely with acrylic and methacrylic derivatives, by a free radical mechanism.

The method for producing tetrachloroethyoxyethyl acrylate and methacrylate monomers and the method for their polymerization and copolymerization are illustrated in the following examples.

EXAMPLE 1

Pyridine (75 ml) in 500 ml of diethyl ether and 65 ml of thionyl chloride are mixed while being stirred and cooled by an ice-water bath in a flask provided with a mechanical stirrer, a reflux condenser and a dropping funnel. A solution of 220 g of crystalline 2-(1-hydroxy-2,2,2-trichloroethoxy)ethyl methacrylate (m.p. 44-45° C; prepared by the addition of chloral to glycol monomethacrylate) in 500 ml of diethyl ether is slowly added to the mixture during continuous stirring and cooling. After all of the hydroxy compound has been added into the reactor, the reaction mixture is stirred and cooled for further 2 hours. It is then warmed to the temperature $20°$ C, the precipitated pyridine hydrochloride is filtered off and ether is removed by distillation. The distillation residue is heated in the presence of 20 g of powdered copper to the temperature $80°$ C at the pressure 15 Torr for 2 hrs and then it is rectified through an effective column. By a repeated fraction distillation, 180 g of 2-(1,2,2,2-tetrachloroethoxy)ethyl methacrylate was obtained, having b.p. 96 - 97° C 0.1 Torr and refractive index $n_D^{25}$ 1.4900. Elemental analysis: found C 32.20%, H 3.58%, Cl47.35%; calculated C 32.46%, H 3.40%, Cl47.90%.

EXAMPLE 2

A solution of 12 g of thionyl chloride in 50 ml of benzene is dropped from a dropping funnel into a mixture consisting of 30 g of 2-(1-hydroxy-2,2,2-trichloroethyoxy)ethyl methacrylate, 12 g of triethylamine and 100 ml of benzene during the continuous stirring and cooling with ice-cold water. After thionyl chloride has been added, the mixture is stirred for 2 hours at room temperature and the precipitated triethylamine hydrochloride is filtered off. Hydroquinone is added (0.2 g) to the benzene filtrate and benzene is removed by distillation at the normal pressure. The residue is fractional distilled through a column in vacuo. The collected main fraction is 23 g of 2-(1,2,2,2-tetrachloroethoxy)ethyl methacrylate has b.p. 170° – 108° C/0.5 Torr and refractive index $n_D^{20}$ 1.4901.

Unsaturated monomers, esters of the general formula I, are non-flammable due to the high content of chlorine. Therefore, they can be used above all as monomers and comonomers for production of polymeric materials with suppressed combustibility.

EXAMPLE 3

A glass ampoule is charged with a solution of 0.06 g of 2,2′-azobisisobutyronitrile in 10 g of 2-(1,2,2,2-tetrachloroethoxy)-ethyl methacrylate (b.p. 96°–97° C/0.1 Torr, $n_D^{25}$ 1.4900), cooled to −78° C, freed from air by an alternate evacuation and feeding with nitrogen, sealed, and then heated for 24 hrs. to the temperature 70° C. The resulting polymeric plug has a high adhesion to glass and is insoluble in benzene or chloroform. After extraction with ether, the polymer weighs 8.5 g; it is non-flammable, brittle, and has the density $d_4^{25}$ 1.48.

EXAMPLE 4

A mixture consisting of 5 g of 2-(1,2,2,2-tetrachloroethoxy)-ethyl methacrylate, 5 g of methyl methacrylate, 40 ml of benzene, and 0.2 g of diisopropyl peroxodicarbonate is heated in a sealed ampoule, which was previously freed from air, for 12 hours to the temperature 25° C. The ampoule is then opened and the reaction mixture is poured into 200 ml of methanol. The precipitated polymer weighs 6.5 g after it has been dried. It is combusted in a flame of the gas burner, but it extinguishes outside the flame.

EXAMPLE 5

A glass ampoule is charged with 3 g of 2-(1,2,2,2-tetrachloroethoxy)ethyl methacrylate, 2 g of styrene, 2 g of butadiene, 0.03 g of dodecyl mercaptan, 0.024 g of potassium peroxodisulfate, 0.35 g of Mersolate, and 12 g of distilled water. The ampoule is freed of air, sealed, and fastened perpendicularly to a shaft which rotates by 30 r.p.m. in a thermostated bath heated to 50° C. After 6 hours, the latex is poured out from the ampoule into 150 ml of methanol acidified by hydrochloric acid. The precipitated polymer weighs 3.8 g after it has been dried. It is soluble in benzene and self-extinguishing.

Homopolymers and mixed polymers of the compound with the general formula I possesss a suppressed flammability or are self-extinguishing. Therefore, they can find their application above all as non-flammable or low-flammable polymeric materials. According to their high adhesion to glass and metals, they may be also used as cements or binders with suppressed flammability.

We claim:

1. Tetrachloroethyoxyethyl esters of the general formula

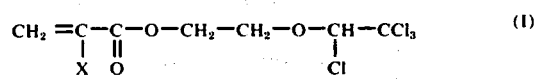

where X is a hydrogen atom or $CH_3$ radical.